United States Patent [19]

Van Steenbrugge

[11] Patent Number: 5,436,618
[45] Date of Patent: Jul. 25, 1995

[54] MULTI-APPARATUS CONSUMER ELECTRONICS SYSTEM

[75] Inventor: Bernard Van Steenbrugge, Eindhoven, Netherlands

[73] Assignee: U.S. Philips Corporation, New York, N.Y.

[21] Appl. No.: 122,825

[22] Filed: Sep. 14, 1993

[30] Foreign Application Priority Data

Sep. 17, 1992 [GB] United Kingdom ............... 9219709

[51] Int. Cl.⁶ .................. H04Q 5/04; H04Q 3/00; H04J 3/22
[52] U.S. Cl. .................. 340/825.25; 340/825.8; 370/85.11
[58] Field of Search .............. 340/825.25, 825.24, 340/825.07, 825.08, 825.54, 825.52; 370/85.1, 85.9, 85.11; 348/706, 8, 721, 734

[56] References Cited

U.S. PATENT DOCUMENTS

| | | | |
|---|---|---|---|
| 4,337,480 | 6/1982 | Bourassin et al. | 348/734 |
| 4,429,384 | 1/1984 | Kaplinsky | 370/85.1 |
| 4,808,992 | 2/1989 | Beyers, Jr. et al. | 348/706 |
| 4,817,203 | 3/1989 | Tsurumoto et al. | 348/734 |
| 4,978,953 | 12/1990 | Hauge | 340/825.52 |
| 5,054,022 | 10/1991 | Van Steenbrugge | 370/85.11 |
| 5,073,773 | 12/1991 | Van Steenbrugge et al. | 340/825.54 |
| 5,130,793 | 7/1992 | Bordry et al. | 348/8 |
| 5,168,361 | 12/1992 | Hackmann | 348/721 |
| 5,187,708 | 2/1993 | Nakatani et al. | 370/85.1 |
| 5,255,097 | 10/1993 | Spiero et al. | 348/706 |

OTHER PUBLICATIONS

Maplin, Sep. 1993–Aug. 1994, Brochure p. 311.
Haase, H. J.; "Present and Future Connections between Television and External Video"; *Funk–Technik*; May 1983; vol. 38 No. 5; pp. 208–212, Germany.
Columbri, F., "The Scart or Euro–Connector and its Video Applications"; *Revista Espanola de Electronica*; Jan. 1985; vol. 32 No. 362; pp. 19–21, Spain.
Harder, C.; "Doing Away with Connector Chaos: One Connector Provides All"; *Funkschau*; Sep. 1982; vol. 18; pp. 50–51 Germany.
Gosch, J.; "Two Buses Organize the Electronic Home"; *Electronics*; Sep. 1981; vol. 54 No. 19; pp. 77–78; USA.
Baxter, T.; "Video Distribution in the Eureka–IHS Network"; *IEEE Transactions on Consumer Electronics*; Aug. 1988; vol. 34 No. 3; USA; pp. 736–743.

*Primary Examiner*—Donald J. Yusko
*Assistant Examiner*—Mark H. Rinehart
*Attorney, Agent, or Firm*—Anne E. Barschall

[57] ABSTRACT

Multi-apparatus consumer electronics system provided with multiple channel for control and data signalization including qualifier bus control channel, and initiator apparatus and follower apparatus for use in such system. A consumer electronics system has plural apparatuses interconnected by a multiple channel for control and data signalization including a control channel. The control channel is a qualifier bus that in each apparatus is interfaced to a control element that in an initiator apparatus transmits a message selectively specifying a proprietary signalization interface. A follower apparatus acknowledges the message if the user signalization interfaces match. Thereupon, the system coactivates the matched interfaces in initiator and follower apparatuses. In an extended form, the apparatuses as a prerequisite try to consent about a standard protocol on a further control channel external to said multiple channel.

11 Claims, 5 Drawing Sheets

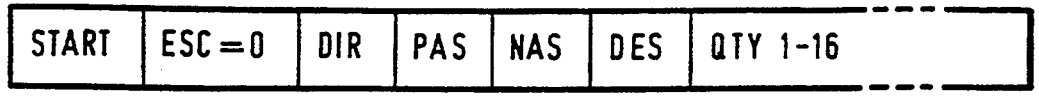
FIG. 3a
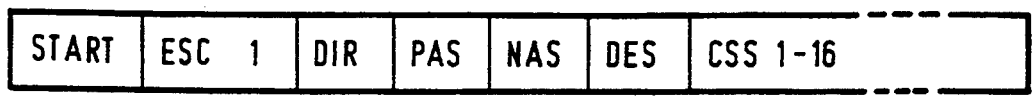
FIG. 3b
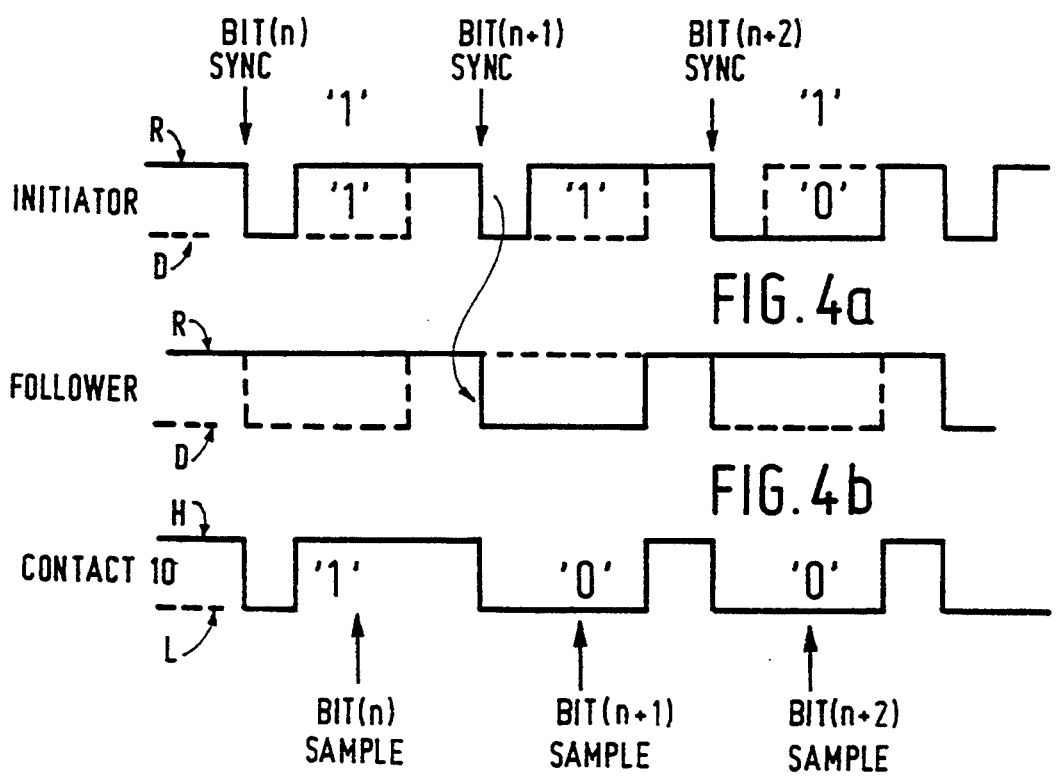
FIG. 4a
FIG. 4b
FIG. 4c

| SOCKET | MULTI-WIRE CABLE | SOCKET |
|---|---|---|
| AUDIO A (out) | 3 ⤫ 3 | AUDIO A (out) |
| AUDIO B (out) | 1 ⤫ 1 | AUDIO B (out) |
| AUDIO A (in) | 6 ⤫ 6 | AUDIO A (in) |
| AUDIO B (in) | 2 ⤫ 2 | AUDIO B (in) |
| AUDIO common return | 4 —— 4 | AUDIO common return |
| VIDEO (out) | 19 ⤫ 19 | VIDEO (out) |
| VIDEO return | 17 ⤫ 17 | VIDEO return |
| VIDEO (in) | 20 ⤫ 20 | VIDEO (in) |
| BLANKING return | 18 —— 18 | BLANKING return |
| RED video | 15 —— 15 | RED video |
| Return contact 15 | 13 —— 13 | Return contact 15 |
| GREEN video | 11 —— 11 | GREEN video |
| Return contact 11 | 9 —— 9 | Return contact 11 |
| BLUE video | 7 —— 7 | BLUE video |
| Return contact 7 | 5 —— 5 | Return contact 7 |
| STATUS and ASPECT RATIO | o—o | STATUS and ASPECT RATIO |
| BLANKING | 16 —— 16 | BLANKING |
| Return contact 10,12 | 14 —— 14 | Return contact 10,12 |
| DATA LINE 1 (undefined) | 12 —— 12 | DATA LINE 1 (undefined) |
| DATA LINE 2 (undefined) | 10 —— 10 | DATA LINE 2 (undefined) |
| COMMON RETURN | 21 —— 21 | COMMON RETURN |

FIG. 5
PRIOR ART

MULTI-APPARATUS CONSUMER ELECTRONICS SYSTEM

BACKGROUND TO THE INVENTION

The invention relates to a consumer electronics system comprising a plurality of apparatuses that are interconnected by a multiple parallel channel for the exchange of control and data signals, said parallel channel including a particular single control channel. A consumer electronics system may in particular comprise audio and/or video as classes of user signals, although other types of services that a user may require are not excluded. A particular example of multi-contact connector is the standardized SCART connector that is used in combination with associated multi-wire cables for interconnecting audio/video apparatuses in the home, and for other applications. There is a proliferation of signal quality types available in modern audio/video systems, depending in particular on the program source. While many of these different signal types can be carried via multiwire cables, either in parallel or as alternatives, consumers will generally need some automated system for selecting and routing of signals to thereby assure the realization of the best quality that is available for watching or recording a given program, or optimizing the use of other facilities.

One solution is to use a proprietary (i.e. dedicated and brand specific) control system for making and breaking paths using pin 10 of the SCART connector system. The problem with such proprietary systems is that they are often only valid for fixed combinations of products. They thereby exclude combining with products of other manufacturers, upgrading to a next product generation and often even combining with other contemporary products from the same manufacturer. Such proprietary solutions therefore need to be redeveloped from generation to generation.

One solution is to use a standard bus system such as the Domestic Digital Bus (D2B) as standardized by the International Electrotechnical Commission (IEC), Geneva, Switzerland and published by them as Standard IEC 1030. A system of apparatuses supporting the D2B Standard a dedicated interconnection for each apparatus, but provides many additional control functions for the user. On the other hand, for the problem of signal quality matching, a simpler control system can be implemented using a spare conductor in the conventional multi-wire cable. Such a control system may be specific to one manufacturer, or may be standardized.

A problem axises in that when two or more control systems (or protocols) are available in a given apparatus, conflicts will arise as to which system actually has control. Also it is not desirable that a consumer who chooses at one point to use a simple control system is then prevented from gaining the benefits of a more functional control system at a later date, and forced to scrap the existing apparatus. In the long term, the consumer will benefit from compatibility of all his or her apparatuses, be they old or flew.

SUMMARY OF THE INVENTION

Accordingly amongst other things, it is an object of the invention to provide, in such consumer electronics systems, an intermediate stage in the development of a standard solution; a particularly useful example of such a standard solution being the above-mentioned D2B system. With current products getting more and more features, the present manufacturer-specific solution need upgrades that may straightforwardly be implemented with the more powerful D2B system when all apparatuses on the system support the D2B protocols. The intermediate stage provided by the present invention provides a system-supported means to find out whether the proprietary system for making and breaking paths (amongst other features) implemented in a first product or initiator apparatus does match or does not match the proprietary system implemented in a second product or follower apparatus (which match is rather unlikely in the case of products from different manufacturers), or whether they both support and alternative standard solution, such as for example the standard bus D2B. In other words, it is an object of the invention to allow an apparatus to use a control system integrated in a multi-wire cable, while maintaining the option to use alternative, more advanced, and in particular, standardized control systems if and when these are supported by the other apparatuses of the system.

According to the present invention there is provided a consumer electronics system comprising an initiator apparatus and at least one follower apparatus connected for communication of system data control signals therebetween by a multiple parallel-path channel, said multiple parallel-path channel having one path thereof, referred to hereinafter as a qualifier bus, reserved for the carriage of interface establishment messages;

said initiator apparatus comprising apparatus respective function means arranged to transmit and/or receive said system data and control signals on paths of said multiple parallel-path channel according to a selected one from a plurality of sets of signal quality parameters supported by said apparatus respective function means, a first control element connected to said apparatus respective function means and coupled to said qualifier bus and operable to generate and send thereon a first interface establishment message identifying said selected set of signal quality parameters;

each of said at least one follower apparatus comprising apparatus respective function means to transmit and/or receive said system data and control messages on said paths of said multiple parallel-path channel according to a selected one from at least one set of signal quality parameters supported by said apparatus respective function means, a second control element connected to said follower apparatus respective function means and coupled to said qualifier bus and operable to detect thereon said first interface establishment message, to determine if a match exists between the set of signal quality parameters identified in said message and said selected one from said at least one set of signal quality parameters supported by said follower apparatus function means, and, if so, to generate and send on said qualifier bus a first acknowledgment message indicating said match; wherein, upon detection of said first acknowledgment message by said first control element, said communication of system data and control signals commences in accordance with the matched set of signal quality parameters.

In this way, the pairing of matched interfaces (i.e. sets of signal quality parameters) becomes extremely straightforward. The initiator apparatus may have only a single proprietary signalization interface suited to a particular communications task, it may have more than one thereof, or it may have only one such interface that may however operate in an environment that allows more than only a single such interface.

Advantageously, where the system comprises a further control channel external to the multiple parallel path channel with a further set of signal quality parameters specified for communications thereon and the initiator and at least one of the one or more follower apparatuses have respective interface means coupling them to the further channel, the first control element may be configured to generate and send on the qualifier bus, prior to the first interface establishment message, a second interface establishment message specifying the further control channel. In such an arrangement, the control element of the at least one follower apparatus connected to the further control channel is operable to generate and send on the qualifier bus a second acknowledgment message and, upon detection of the second acknowledgment message by the control element of the initiator, communications between initiator and follower are established on the further control channel and in accordance with the further set of signal quality parameters specified for that channel. The further control channel may suitably comprise a serial data bus with the further set of signal quality parameters comprising D2B communications protocols. Accordingly, the hierarchy of a system according to the invention may be organized as follows among the standard control protocol and the various interfaces on the multiple parallel path connection. First, if both apparatuses concerned are found to support the D2B or other external protocol this will subsequently be used. Next, if one or both apparatuses do not support D2B, but both have the same in-built solution implemented, the latter will be used. Only if no corresponding solution has been implemented, no control features can be communicated between the two apparatuses concerned. In situations concerning more than two apparatuses at a time, with the apparatuses being chain-connected, similar considerations apply between each respective pair of apparatuses.

Advantageously, said first control element is operable to generate and send on said qualifier bus a single message format having a fixed portion thereof within which is transmitted one or other of said first and second interface establishment message. The fusing of first and second messages to a single format that is transmitted only once, speeds up the selection.

Advantageously, where said initiator apparatus respective function means supports at least one still further set of signal quality parameters governing said communication of system data and control signals by said initiator apparatus and via said multiple parallel-path channel, said first control element being operable to specify said at least one still further set of signal quality parameters in addition to, or in the alternative to, said further communication channel in said second interface establishment message, and said single message format having a further fixed portion thereof, prior to said portion reserved for said first or second interface establishment messages, within which is transmitted an escape signal having either a dominant or a recessive value, wherein a dominant value precedes said first interface establishment message and a recessive value precedes said second interface establishment message. In this way, an initiator apparatus that does not have a specific signal quality indication protocol gets its way by default, and on the other hand, the signalling of particular sets of signal quality parameters is particularly fast. Said second control element generates said first and second acknowledgment messages by selectively modifying said first and second interface establishment messages respectively and returning said single message format including said modified first or second interface establishment message to said initiator apparatus, and wherein said second control element is further operable to include in said returning single message format an escape acknowledgment signal having either a dominant or a recessive value, wherein a dominant value precedes said first acknowledgment message and a recessive value precedes said second acknowledgment message. The same advantages are now attained with respect to a follower apparatus.

Advantageously, where said initiator apparatus and the, or each of, said follower apparatuses are chain-wise connected by a respective said multiple parallel-path channel between the, or each, successive pair of said apparatuses, and said first control element is operable to include in said single message format a direction signal indicating in which direction along said chain-wise connection of apparatuses the, or a selected one of, the follower apparatuses lies.

The invention also provides to an initiator apparatus and a follower apparatus for use in a system as described above. Further advantageous aspects of the invention are recited in the following description and the appended claims.

BRIEF DESCRIPTION OF THE DRAWING

These and other aspects and advantages of the invention will be better appreciated with regard to the description of preferred embodiments hereinafter, and in particular with reference to the appended Figures that show in particular:

FIG. 3 shows the frame format of control signals tranmsitted via a control wire in the multi-wire cable;

FIG. 4 shows representative bit waveforms for the control signals;

FIG. 5 shows the signal allocations for two connectors and a multi-wire cable for a known SCART/Peritel data link.

DETAILED DESCRIPTION OF PREFERRED EMBODIMENTS

Figure 1:
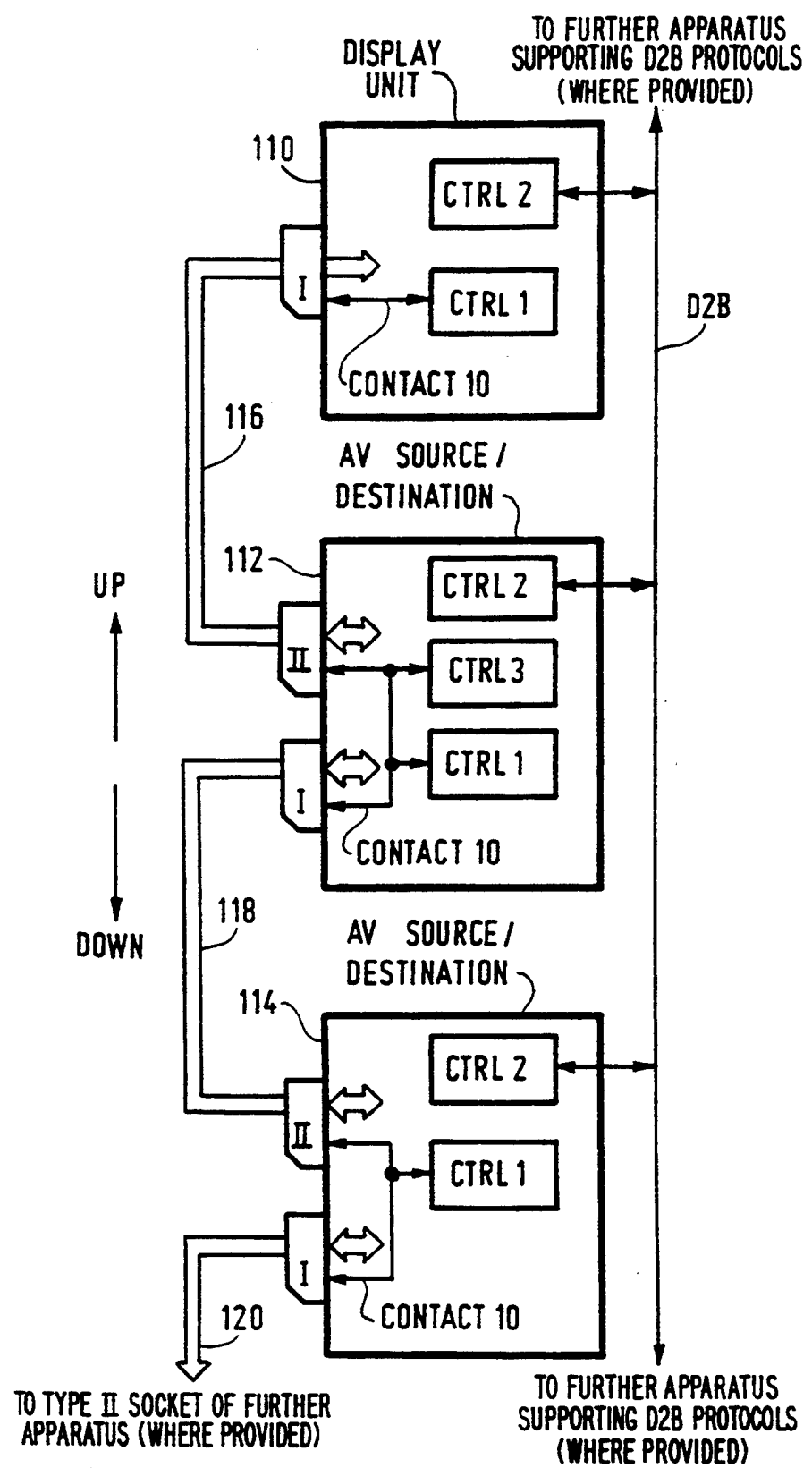
FIG. 1 shows a system of audio/video apparatuses interconnected for the communication of AV signals and control signals.
Figure 6:
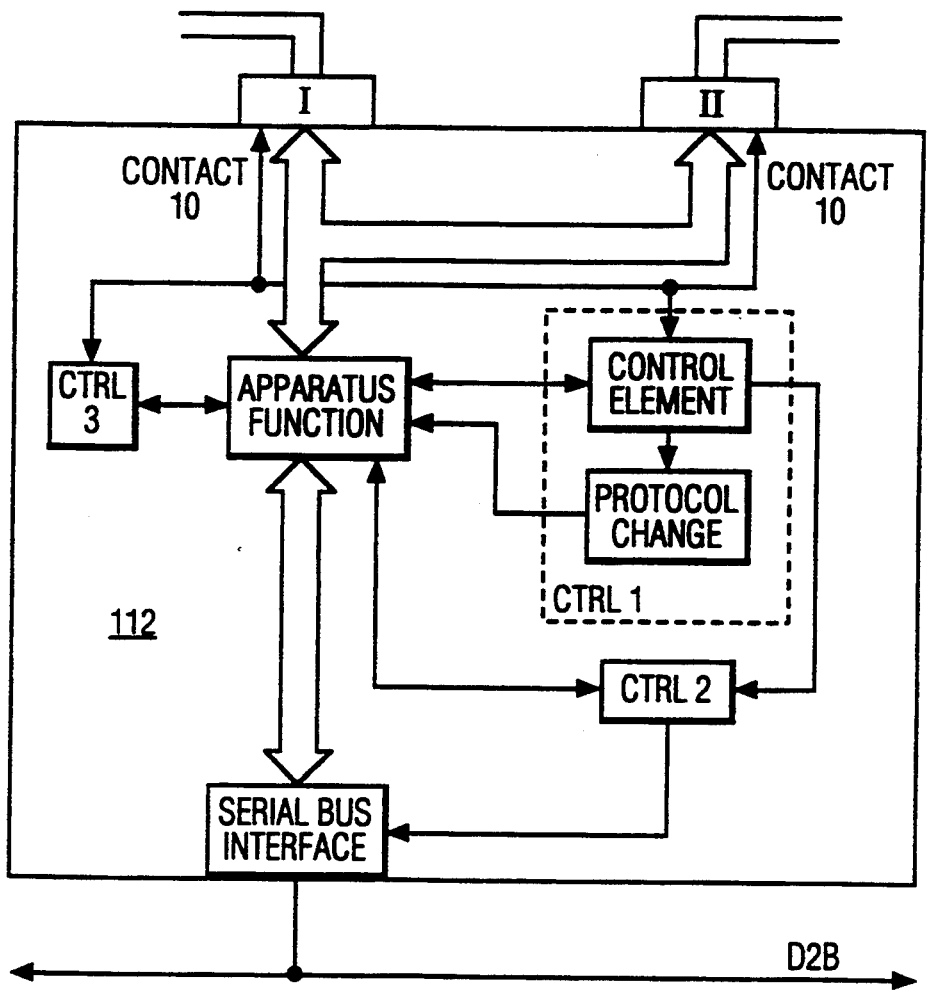
FIG. 6 schematically illustrates one of the apparatuses of FIG. 1.

FIG. 1 shows a system of domestic audio/video (AV) apparatuses 110, 112, 114 etc. of which only three are shown for reasons of clarity. The first apparatus 110 is a display unit (television receiver or video monitor), while the remaining units are various AV apparatuses (VCR, satellite tuner, video disc player etc.) capable of acting as sources and/or destinations of AV signals. One apparatus 112 is shown schematically in greater detail in FIG. 6. The section of that Figure labelled "Apparatus Function" will be understood to refer to the circuits and features provided consequent on the particular function of the apparatus as a VCR, satellite tuner, etc.

Each apparatus has one or two special multi-wire sockets, physically similar to the well-known SCART or Peritel sockets (standard IEC 933-1). the pin-out and interconnection arrangements for a pair of such Peritel Sockets are shown in FIG. 5. The apparatuses are connected in a chain-like manner via multi-wire cable 116, 118, 120 etc., starting from the display unit 110. As will be appreciated, where the system comprises only the three apparatuses shown (110, 112, 114), only multi-wire cables 116 and 118 will be required. AV signals can pass through these cables in both directions, respectively and are designated "up-stream" or "down-stream", according to whether they are travelling towards or away from the display unit 110.

Figure 2:
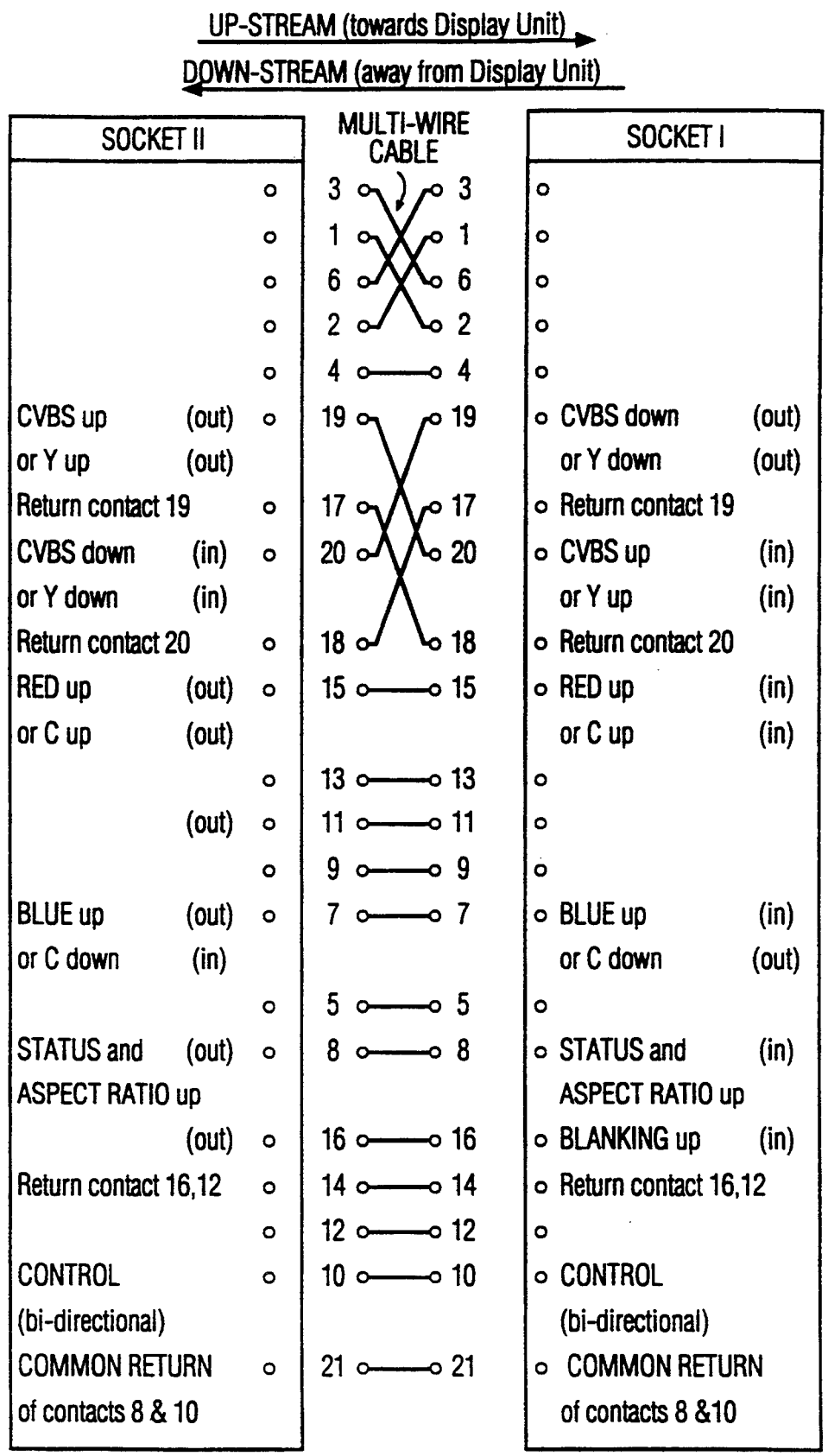
FIG. 2 shows the signal allocations for two connectors and a multi-wire cable used in the system.

Referring also now to FIG. 2, the special sockets are designated "I", if they are for connection to an apparatus which is down-stream in the chain, and "II", if they are for connection to an apparatus which is up-stream in the chain. In accordance with its position always at the head of the chain, the display unit apparatus 110 has only a type "I" socket.

FIG. 2 shows the assignment of signals among numbered contacts 1-21 of the special SCART-like sockets: type "II" on the left and type "I" on the right. Note that where no such assignment is shown in FIG. 2, the function is as for the correspondingly numbered pin in the prior-art SCART/Peritel Sockets of FIG. 5. The corresponding conductors in the multi-wire cable are also shown, in the central column of the Figure. In each apparatus, the corresponding contacts of sockets "I" and "II" are connected through to each other, either directly or via switches, so that the apparatus can send and receive AV signals to other apparatuses via the up-stream or down-stream signal paths. The user interface of each apparatus allows the user to distinguish between the up- and down-stream signal paths. For example, a VCR forming apparatus 112 (FIG. 1) may be given a RECORD UP command to record signals from a source apparatus (such as 114) further down the chain, and a RECORD DOWN command to record a signal coming from a signal source (TV tuner) in the display unit apparatus 110. Broadly speaking, the up-stream path will be used for playing functions to the user, and the down-stream path for recording.

While any multi-wire interconnection system may be used, the particular allocation of contacts 1-21 shown in FIG. 2 provides a good degree of compatibility with the existing standard, as shown in FIG. 5, allowing for the presence in the system of older apparatuses with conventional SCART connectors. Signal names, levels and impedances are accordingly made compatible with the existing conventions, unless stated otherwise.

Note that in each cable connection, there are two audio signal channels, A and B. Depending on the source of signals, channels A and B may be a stereo pair, or may carry monaural sound in two alternative languages. For video signals, similarly, the same program can be carried in various forms, referred to herein as signal qualities. There are up- and down-stream paths for composite video signals (CVBS), for signals with separate luminance and chrominance (Y and C), and there is an up-stream path only for primary colour signals RED, GREEN and BLUE (RGB).

Of these video signal qualities, RGB is preferred over Y/C, which is in turn preferred over CVBS. However, each source and destination apparatus may be limited in the signal qualities it can generate or accept at a given particular time, or at all times. Furthermore, the limited number of contacts and wires means that not all qualities can be carded in both directions at the same time. Note that signals CVBS up and C up share the same conductor as do signals CVBS down and C down, signals RED up and C up, and signals BLUE up and C down. An additional aspect of signal quality today is the aspect ratio of a video picture: whether it is of normal or wide screen format.

Some control mechanism is clearly required, at least to determine which signal qualities should be used at any point in a signal path, be it up-stream or down-stream, and this is provided by reserving one signal path for the carriage of interface establishment messages. The path, referred to hereinafter as the qualifier bus, is connected to each compatible apparatus via contact 10. Each apparatus 110, 112 and 114 has a first control interface module CTRL1 within it to transmit and receive message frames via contact number 10. Contact 10 (and its return contact 21) are connected directly through each apparatus from socket 'I' to socket 'II'.

FIG. 3 shows two types of message frame which can be sent by a module CTRL1 via the qualifier bus (contact 10). A message frame will generally be sent when an apparatus changes state, typically as a result of a user command, or for example upon the triggering of a VCR timed recording. The apparatuses do not have individual addresses. Rather, for each frame, one apparatus acts as "initiator" of the message, while the others, referred to as "followers", are obliged to 'listen' to the frame. However, it will be seen that a follower is allowed to modify certain bits in each frame. The means for generation of message frames by a control element of CTRL 1 (FIG. 6) may comprise a suitably programmed microprocessor with associated memory as will be readily apparent to the skilled person and will not be further described.

FIG. 4 shows representative bit waveforms at the outputs of an initiator and a follower. The signal level actually present on the qualifier bus (contact 10) is shown at the foot of FIG. 4, and takes either a low or a high level, labelled L and H respectively. The output of each apparatus has a low impedance (dominant) state, labelled D in the figure, and a high impedance (recessive) state, labelled R. Since the outputs of all modules CTRL1 are connected together via the qualifier bus, the level on the bus is a logical combination (wired-AND) of the outputs of all modules CTRL connected in the chain. Any output in the dominant state D will force the qualifier bus low (L). The qualifier bus will only be high (H) when all outputs are in the recessive (R) state.

FIG. 4 illustrates three representative bit periods, numbered n, n+1 and n+2, during which the control element of the initiator CTRL1 module outputs logical values '1', '1' and '0' in sequence. Each bit begins with a transition to the dominant state, at a time labelled BIT SYNC. All followers synchronize their bit timing to this event. At a predetermined time BIT SAMPLE following each BIT SYNC transition, the state D or R of the initiator output indicates, respectively, whether a '0' or '1' bit is being transmitted. On the other hand, the actual level L or H on the qualifier bus at time BIT SAMPLE determines whether a logic '0' or logic '1' value is received for that bit by each module CTRL1. As can be seen in FIG. 4, the bits n and n+2 will be received as logic '1' and '0' respectively, namely the values transmitted by the initiator. The bit n+1, however, is modified by the dominant output of the follower, so that a '0' will be detected instead of the '1' transmitted by the initiator. The initiator also samples the actual level on contact 10, so that it too knows the modified bit value.

In FIG. 3, two alternative frame formats are shown. Having established that no other module is transmitting on the qualifier bus, the initiator generates a START signal for the frame, by making its output dominant for a predetermined period. The frame continues with a header comprising five bits labelled ESC, DIR, PAS, NAS and DES, then a further sixteen data bits. When ESC=0, the sixteen bits are designated Quality bits QTY 1–16, as shown in FIG. 3a. When ESC=1, the sixteen data bits are designated Control System Supported bits CSS 1–16, as shown in FIG. 3b.

In a frame with ESC=0, the header and Quality bits provide a system for management of the signal path switching and video signal qualities, to provide the user with best quality signal paths from source to destination in up- and down-stream directions. This is achieved by the exchange of header and data bits. Some of the the header and data bits must only be set by the initiator, and will be referred to as flag bits. Others of the header and data bits may be modified by a follower, and are known as Arbitration bits. The detailed meaning of these bits will be described later. For the avoidance of doubt, a frame sent by the initiator corresponds to the first interface establishment message referred to herein before and the frame as modified or not (as the case may be) by the follower corresponds to the first acknowledgment message. The above-mentioned second interface establishment message corresponds to the frame sent by the initiator when it supports D2B or another proprietary control system, that is to say a frame where the escape bit ESC=1.

Returning to FIGS. 1 and 6, these show how other control modules of type CTRL2 and CTRL3 may be provided in a consumer apparatus. A module CTRL2 provides for control of and by the apparatus via a standard control bus, namely the D2B bus and related protocol as described in standard IEC 1030 mentioned previously D2B distributes system control intelligence over all apparatuses, while providing for cooperation between apparatuses of different brands in a standardised manner. Compared with the CTRL1 system described so far, D2B requires dedicated cabling between apparatuses, but has the advantages of a full range of control features, more flexible signal routing, a higher data rate, full device-subdevice addressing and message security (parity checking). Due to crosstalk within the multi-wire cables, for example, the data rate of the qualifier bus (SCART contact 10) must be kept very low. An example of D2B in application can be found in GB 2 223 114 A (PHN 12678), which describes the automatic establishment of signal paths between source and destination devices.

Like module type CTRL 1, module type CTRL3 uses contact 10 and the qualifier bus to provide a control function which is proprietary to one supplier. Various suppliers already produce or plan to produce apparatuses using contact 10 for their own purposes, and it is desirable that the system proposed by the present invention should be able to function as an alternative to D2B or such a propriety system within the same apparatus. Otherwise the purchaser of a CTRL I type apparatus would be 'locked out' of the market for enhanced facilities offered by D2B or proprietary solutions. The Control System Supported bits CSS 1–16 of the second message frame format (ESC=1) provide a system of arbitration which selects the control module CTRL1, 2 or 3 to be used from among those available in the relevant apparatuses.

In the following embodiment, it is assumed that each participating apparatus supports signal path and quality control via a module CTRL1, optionally via D2B (CTRL2), and optionally via one proprietary control protocol (CTRL3) only. Alternative embodiments can readily be conceived if necessary, for example to allow more than one proprietary control system, and other standard systems using the multiwire cables or dedicated wiring, optical fibres etc.

The behaviour of the initiator and followers during a frame are defined below, with examples in a form of pseudo-code. The code will be largely self explanatory to the person skilled in the art, when keeping in mind the frame format as outlined in FIG. 3 and the bit waveforms of FIG. 4. It should be remembered in particular that a logic '1' in any bit position is recessive, so that a logic '0' output by another apparatus will predominate. As an example, the notation "Output QTY1=1" indicates the value '1' for a bit output by the relevant apparatus during bit period QTY1, while "Sample QTY1=0" indicates that the actual bit value detected on the control wire (contact 10) during the same bit period is logic '0'. Explanatory comments appearing within the pseudo code segments are placed between curly brackets (braces) thus: {...}.

Following the START bit, each bit of the frame is processed simultaneously by the initiator and the followers. The first Header Bit is the Escape Bit ESC. As mentioned above, the setting of the Escape Bit depends on whether the initiating apparatus wishes to perform signal quality optimisation (ESC=0) or to select the control system (ESC=1).

```
BEGIN[ESC]
    INITIATOR:
        Output ESC=0
        IF Sample ESC=0 THEN data bits are Signal Quality Bits
        ELSE data bits are Control System Supported Bits
        END
    FOLLOWER:
        Output ESC=1 {recessive}
        IF Sample ESC=0 THEN data bits are Signal Quality Bits
        ELSE data bits are Control System Supported Bits
        END
```

The second Header Bit, DIR, is the Direction Bit. The setting of this determines whether this control frame concerns AV signals travelling up-stream (DIR=1) or down-stream (DIR=0). This is of course relevant for switch settings and signal called capabilities within each apparatus.

```
BEGIN [DIR]
    INITIATOR:
        IF signal direction is up-stream THEN Output DIR=1
        ELSE Output DIR=0
        END
        IF Sample DIR=0 THEN direction is down-stream
        ELSE direction is up-stream
        END
    FOLLOWER:
        Output DIR=1 {recessive}
        END
        IF Sample DIR=0 THEN direction is down-stream
        ELSE direction is up-stream
        END
```

The third Header Bit, PAS, is used to determine whether any apparatus is Presently an Active Source of AV signals for an established signal path in the specified direction. If the initiator determines that an active source of AV signals already exists (by setting its output PAS=1 and detecting PAS=0) it may terminate the attempt to establish communications.

```
BEGIN [PAS]
    INITIATOR:
        IF initiator is present active source THEN Output PAS=0
        ELSE Output PAS=1 {recessive}
        END
        IF Sample PAS=0 THEN source is present
        ELSE there is no active source
        END
    FOLLOWER:
        IF follower is present active source THEN Output PAS=0
        ELSE Output PAS=1 {recessive}
        END
        IF Sample PAS=0 THEN source is present
        ELSE there is no active source
        END
```

The fourth Header Bit, NAS, is used to determine whether any apparatus is a New Active Source of AV signals.

```
BEGIN [NAS]
    INITIATOR:
        IF initiator is new active source THEN Output NAS=0
        ELSE Output NAS=1 {recessive}
        END
        IF Sample NAS=0 THEN source is new
        ELSE there is no new source
        END
    FOLLOWER:
        IF follower is new active source THEN Output NAS=0
        ELSE Output NAS=1 {recessive}
        END
        IF Sample NAS=0 THEN source is new
        ELSE there is no new source
        END
```

The fifth Header Bit, DES, complements the Presently Active Source PAS bit. An apparatus responds with the DES bit dominant (that is to say it outputs DES=0) when it is active as a destination for AV signals in the specified direction.

```
BEGIN [DES]
    INITIATOR:
        IF initiator is active as destination THEN Output DES=0
        ELSE Output DES=1 {recessive}
        END
        IF Sample DES=0 THEN there is an active destination
        ELSE there is no active destination
        END
    FOLLOWER:
        IF follower is active as destination THEN Output DES=0
        ELSE Output DES=1 {recessive}
        END
        IF Sample DES=0 THEN there is an active destination
        ELSE there is no active destination
        END
```

Turning to the data bits, for a frame with Sample ESC =0, the data bits are signal quality bits QTY 1–16. Initiator and Follower need not be distinguished for the following exmaples, provided that the reader notes the distinction between 'flag' type bits and 'arbitration' type bits defined above.

```
BEGIN [Signal Quality Bits]
    {QTY 1-6 are Arbitration type bits for determining the best
    video quality capabilities available in the signal path:}
        Output QTY1,2,3=0 {these are available for future use}
        IF Y/C quality supported THEN Output QTY4=1
        {recessive}
            ELSE Output QTY4=0 {dominant; Y/C
            not acceptable}
        IF RGB quality supported THEN Output QTY5=1
        {recessive}
            ELSE Output QTY5=0 {RGB not acceptable}
        IF Wide Screen supported THEN Output QTY6=1
        {recessive}
            ELSE Output QTY6=0 {Wide Screen not
            acceptable}
    {QTY 7-16 are Flag type bits set by a source apparatus.
    A logic '1' in this position indicates that the signal
    qualities or other attribute applies to the signal actually
    being supplied. The meaning of each attribute will be
    apparent to the person skilled in the art.}
        QTY7 {Full field wide screen video is supplied}
        QTY8 {Letterbox format video is supplied}
        QTY9 {Video shifted upwards is supplied}
        QTY10 {Demodulated helper is supplied
        (PAL-plus system)}
        QTY11 {Digital Audio is supplied}
        QTY12 {Audio only is supplied}
        QTY13 {Audio supplied is bilingual}
        QTY14-16 {available for future use}
END [Signal Quality Bits]
```

In a frame where Sample ESC=1 the data bits are Control System Supported bits CSS1 ... CSS16 the functions of which are defined in the following example.

```
BEGIN [Control System Supported]
    IF D2B standard is supported (module CTRL2 present)
        THEN Output CSS1=1
        ELSE Output CSS1=0 {dominant}
    {CSS2...CSS15 are 'Flag' type bits, set by the initiator
    of the frame, and specify that the relevant control system is
    supported as follows:}
        IF Proprietary system is supported (module CTRL3
        present)
            THEN Output CSS2...CSS15 = Control System
            Number
                {The bits CSS2...CSS15 carry a binary
                number identifying a proprietary control
                system using contact 10.}
            ELSE Output CSS2...CSS15 = zero
    {CSS16 is an Arbitration type bit, and will be forced to '0'
    if any apparatus in the signal path does not support the
    proprietary system.}
        IF specified proprietary system is supported
            THEN Output CSS16=1
                {proprietary system acknowledged}
            ELSE Output CSS16=0 {dominant}
END [Control System Supported]
```

From the above, it will be apparent to the skilled person how the best signal quality which is supported throughout the signal path can be identified and used to implement the user's wishes using the best possible quality. For example, if any apparatus in the chain does not support RGB quality signals, the bit QTY5 will be forced low by that apparatus, telling the source apparatus that Y/C or CVBS must be used.

Similarly, a priority is established between the various control systems and protocols that may be available within the system. If the D2B standard is supported by all apparatuses in the signal path, then bit CSS 1 will be '1'. Then all apparatuses will respond to control via their D2B interface (modules CTRL2) only. This is desirable in view of the greater range of control features provided, inter-brand compatibility, better error handling and so forth.

On the other hand, if not all apparatuses can be controlled via D2B, but they can communicate via the qualifier bus (contact 10), then it is desirable that they do so. If all apparatuses are provided with control modules CTRL3 which each support a common proprietary control system, then this may be preferred over the use of the CTRL1 system.

Many variations will be readily envisaged by the skilled reader, and the scope of the present invention is in no way limited to the specifics of the above embodiment.

I claim:

1. A consumer electronics system comprising:
    an initiator apparatus
    at least one follower apparatus connected to the initiator apparatus by a multiple parallel-path channel for communication of system data and control signals therebetween, said multiple parallel-path channel including a qualifier bus reserved for carrying an interface establishment message, said initiator apparatus including:
    initiator apparatus respective function means for transmitting and/or receiving said system data and control signals on the paths of said multiple parallel-path channel according to a selected set of signal quality parameters supported by said initiator apparatus respective function means, and
    a first control element operably connected to said initiator apparatus respective function means and to said qualifier bus for generating and sending thereon a first interface establishment message which identifies said selected set of signal quality parameters;
    further in which the at least one follower apparatus includes:
    follower apparatus respective function means for transmitting and/or receiving said system data and control messages on said paths of said multiple parallel-path channel according to a selected set of signal quality parameters supported by said follower apparatus respective function means, and
    a second control element connected to said follower apparatus respective function means and to said qualifier bus for detecting thereon said first interface establishment message, so that if a match exists between the set of signal quality parameters supported by the initiator respective function means identified in said message and said selected set of signal quality parameters supported by said follower apparatus respective function means, generating and sending on said qualifier bus a first acknowledgment message indicating said match;
    wherein, upon detection of said first acknowledgment message by said first control element, said communication of system data and control signals commences in accordance with the matched set of signal quality parameters.

2. A system as claimed in claim 1, comprising:
    a further control channel external to said multiple parallel path channel and having a further set of signal quality parameters specified for communications thereon;
    wherein said initiator apparatus and at the least one follower apparatus have respective interface means coupling their respective apparatus function means to said further control channel for communications thereupon;
    wherein said first control element is operable to generate and send on said qualifier bus, prior to said first interface establishment message, a second interface establishment message specifying said further control channel;
    wherein said second control element in said at least one follower apparatus interfaced to said further control channel is operable, on detection of said second interface establishment message, to generate and send on said qualifier bus a second acknowledgment message; and
    wherein, upon detection of said second acknowledgment message by said first control element, said communication of system data and control signals commences through said further control channel and in accordance with said further set of signal quality parameters.

3. A system as claimed in claim 2, wherein said first control element is operable to generate and send on said qualifier bus a single message format having a fixed portion thereof within which is transmitted one of said first and second interface establishment messages.

4. A system as claimed in claim 2, wherein said further control channel is a serial data bus and said further set of signal quality parameters comprise D2B communications protocols.

5. A system as claimed in claim 1, wherein said first control element comprises protocol changing means connected to said initiator apparatus respective function means and to said first control element, so that said apparatus respective function means changes said selected set of signal quality parameters to another selected set of signal quality parameters, said protocol changing means having a configuration such that, in the event said first control element does not receive said first acknowledgment message in response to said first interface establishment message, to cause said initiator apparatus respective function means to change said selected set of signal quality parameters and then to cause said first control element to send a further first interface establishment message identifying said another selected set of signal quality parameters.

6. A system as claimed in claim 3, wherein said initiator apparatus respective function means supports at least one still further set of signal quality parameters governing said communication of system data and control signals by said initiator apparatus and via said multiple parallel-path channel, said first control element being operable to specify said at least one still further set of signal quality parameters in addition to, or in the alternative to, said further communication channel in said second interface establishment message, and said single message format having a further fixed portion thereof, a part of said portion reserved for one of said first and second interface establishment messages, within which is transmitted an escape signal having one of a dominant and a recessive value, wherein the dominant value precedes said first interface establishment message and the recessive value precedes said second interface establishment message.

7. A system as claimed in claim 6, wherein said second control element generates said first and second acknowledgment messages by selectively modifying said first and second interface establishment messages respectively and returning said single message format including one of said modified first and second interface establishment messages to said initiator apparatus, and wherein said second control element is further operable to include in said returning single message format an escape acknowledgment signal having one of a dominant and a recessive value, wherein the dominant value precedes said first acknowledgment message and the recessive value precedes said second acknowledgment message.

8. A system as claimed in claim 3, wherein said initiator apparatus and the at least one follower apparatus are chain-wise connected by at least one respective said multiple parallel-path channel between each successive pair of said apparatuses, and said first control element is operable to include in said single message format a direction signal indicating in which direction along said chain-wise connection of apparatuses a selected at least one of the follower apparatuses lies.

9. A system as claimed in claim 3, wherein said first control element is operable to include in said single message format at the start thereof an initialization signal, and said second control element is operable to detect said initialization signal and acknowledge detection to said first control element via said qualifier bus.

10. An initiator apparatus for use in a consumer electronics system, comprising:
multiple parallel-path connector means connectable to respective ones of multiple parallel paths of a multiple parallel-path channel having one path, referred to as a qualifier bus, reserved for carrying a plurality of interface establishment messages;
initiator apparatus respective function means connected with said multiple parallelpath connector means for transmitting and/or receiving system data and control signals on the paths other than said qualifier bus of said multiple parallel-path channel, said apparatus respective function means supporting a plurality of predetermined sets of signal quality parameters governing said transmission and/or reception of the system data and control signals, in which a selected one of said plurality of sets is followed at any instant, and for changing said selected one of said plurality of sets to another of said plurality of sets in response to a protocol-change command;
a first control element connected to said initiator apparatus respective function means and said multiple parallel-path connector means, said first control element being arranged to receive information from said apparatus respective function means identifying said selected one of said sets of signal quality parameters, and being operable to generate a first interface establishment message based on said information and send said first interface establishment message, via said multiple parallel path connector means, on said qualifier bus; and
protocol changing means connected to said first control element and said apparatus respective function means and operable, in response to a command generated and supplied thereto by said first control element, to generate and send to said apparatus respective function means said protocol-change command,
wherein said first control element is further operable to detect, via said multiple parallel path connector means, signals on said qualifier bus and, on detection of a predetermined first acknowledgment message in response to said first interface establishment message, to initiate said transmission and/or reception of said system data and control signals by said apparatus respective function means and in accordance with said selected one of said sets of signal quality parameters.

11. A follower apparatus for use in a consumer electronics system, comprising:
multiple parallel-path connector means connectable to respective ones of multiple parallel paths of a multiple parallel-path channel having one path, referred to as a qualifier bus, reserved for carrying a plurality of interface establishment messages;
follower apparatus respective function means connected with said multiple parallelpath connector means for transmitting and/or receiving system data and control signals on the paths other than said qualifier bus of said multiple parallel-path channel, said apparatus respective function means supporting at least one predetermined set of signal quality parameters governing said transmission and/or reception of the system data and control signals;
a second control element connected to said apparatus respective function means and said multiple parallel-path connector means, said second control element being arranged to receive information from said apparatus respective function means identifying said at least one predetermined set of signal quality parameters, and being operable to detect, via said multiple parallel-path connector means, signals on said qualifier bus including a first interface establishment message identifying a set of signal quality parameters supported by said initiator apparatus, to compare said initiator-supported set of signal quality parameters with said at least one predetermined set and, where a match occurs, to generate and send on said qualifier bus a first acknowledgment message; wherein, on generation of said first acknowledgment message in response to said first interface establishment message, said second control element is operable to initiate said transmission and/or reception of said system data and control signals by said apparatus respective function means and in accordance with said matched set of signal quality parameters.

* * * * *